Patented June 4, 1940

2,203,257

UNITED STATES PATENT OFFICE 2,203,257

DRY DYESTUFF PREPARATION

David Alexander Whyte Fairweather, Blackley, Manchester, England, assignor to Imperial Chemical Industries Limited, a corporation of Great Britain No Drawing. Application July 26, 1938, Serial No. 221,439. In Great Britain July 30, 1937

2 Claims. (Cl. 8—35)

This invention relates to making dry preparations of soluble salts of sulphuric esters of leuco vat dyestuffs of the anthraquinone series.

As compared with the aqueous pastes of preparations of the same ester dyestuffs, the dry preparations have the advantage of being less bulky to transport and store, cleaner and more convenient to handle and use, and less liable to decompose.

In manufacturing the ester dyestuffs from the vat dyestuffs, they are ordinarily obtained in the first instance as aqueous pastes. Various ways of obtaining dry preparations from the pastes have been described. British specification No. 288,358 describes mixing the aqueous paste with a salt or other substance which will combine with the water present to form a solid hydrated compound, preferably of a neutral or alkaline character. British specification No. 333,147 describes mixing the aqeous paste with a dispersing agent, such as sulphite cellulose liquor, formaldehyde - naphthalene - sulphonic - acid-condensation products, molasses, saponin, etc., after making faintly alkaline, if necessary, and then drying, if necessary under reduced pressure. British specification No. 443,998 describes making stable dry preparations by mixing the paste containing an excess of alkali and an agglutinant, such as glucose, molasses, sulphite celulose liquor, dextrin, gum or glue and then evaporating the paste to dryness, if necessary under reduced pressure. It also describes the addition of urea to the paste, as well as the excess alkali and agglutinant. German patent specification 636,269 describes a similar process to that of British specification No. 443,998, in which the addition of urea to the paste before drying and the use of reduced pressure in evaporating the paste to dryness are obligatory features.

These processes have certain disadvantages in certain circumstances. That of British specification No. 288,358, while simple to carry out and requiring no evaporative treatment, gives preparations which for some purposes contain an inconveniently large proportion of the solid diluent. This large proportion of solid diluent, in the preparation, means that the advantage of small bulk is partly lost. The large proportion of solid diluent may also be an inconvenience or impediment in printing, especially if the diluent is an alkaline substance. The processes of British specifications Nos. 333,147 and 443,998 and German patent specification No. 636,269 ordinarily involves an evaporation heating treatment and this treatment, especially with pastes of a sticky nature may necessitate considerable heating, which is not well adapted for use with the less stable dyestuffs.

This invention has as an object to provide dry preparations of the soluble salts of sulphuric esters of leuco vat dyestuffs of the anthraquinone series. A further object is to devise a method of preparing such dry preparations. A still further object is to devise a method of preparing such dry preparations which will not have the disadvantages mentioned above. A still further object is to provide such preparations having the minimum bulk. Further objects will appear hereinafter. These objects are accomplished by the following invention.

I have now found that dry preparations of the ester dyestuffs specified may be made by the process which comprises mixing an aqueous paste containing a soluble salt of a sulphuric ester of the leuco anthraquinone vat dyestuff with an organic liquid as defined below, and a water-soluble dyestuff diluent also as defined below, and a small proportion of alkali, and then removing the liquor from the resulting mixture by filtering or centrifuging, and then submitting the filtered or centrifuged material, after washing with the organic liquid if desired, to a mild drying treatment. After filtering or centrifuging, and before or after the subsequent drying, additional substances may be added, for example, substances adapted to increase solubility and for use as standardising diluents. These substances may be the water-soluble dyestuff diluents or other ingredients already mentioned or they may be other substances, for example, urea. The components of the mixture need not be brought together in any special order; for instance, the dyestuff diluent and the alkali may be added to the ester dyestuff paste, and this mixture then added to the organic liquid, or the dyestuff diluent and the alkali can be added to the organic liquid, and this mixture then added to the dyestuff paste.

The organic liquids which are used in the above process are inert organic water-soluble liquids, of boiling point below 100° C., which do not dissolve the ester dyestuffs or only dissolve them to a slight extent. Methyl and ethyl alcohols are two of the most suitable liquids for the purpose. The alkali may be, in part, that which is ordinarily present in the ester dyestuff paste, when alkali has been used in the isolation of the ester dyestuff from the mixture in which esterification has been effected. The alkali serves to counteract any slight solubility of the ester dyestuffs in the organic liquid, and also acts as a stabiliser in the dry preparation. Alkali is conveniently added to the organic liquid, including that used in washing. By a water-soluble dyestuff diluent I include water-soluble dispersing agents and agglutinants, for instance, dextrin, glucose, sulphite cellulose liquor, and formaldehyde-naphthalene-sulphonic acid condensation products.

The following examples, in which parts are by weight, illustrate but do not limit the invention.

Example 1

12 parts of dextrin are stirred into 50 parts of an aqueous paste of the sodium salt of the sulphuric ester of leuco-dimethoxydibenzanthrone (containing 9 parts of the ester salt and about 1.8 parts of sodium carbonate). 150 parts of ethyl alcohol are slowly stirred in, followed by 3 parts of potassium hydroxide powder. The mixture is filtered, the filter-cake sucked as free of liquid as possible, washed with 50 parts of ethyl alcohol, containing 1.5 parts of dissolved potassium hydroxide, dried at 30°-40° C. and pulverised.

In the above process, methyl alcohol may be used instead of ethyl alcohol.

Example 2

An aqueous paste of the potassium salt of the tetra-sulphuric ester of 3:3'-dichlorodianthrahydroquinoneazine (containing 116 parts of the ester salt and about 15 parts of sodium carbonate) is well mixed with a mucilage made from 42 parts of dextrin, 42 parts of water and 1 part of potassium hydroxide. The paste so-obtained is slowly stirred into a solution of 30 parts of potassium hydroxide in 600 parts of ethyl alcohol and stirring is continued for a short time. The resulting granular precipitate is filtered off, washed with 200 parts of ethyl alcohol containing 10 parts of dissolved potassium hydroxide, dried at 40-45° C. and pulverised.

Example 3

An aqueous paste of the potassium salt of the tetrasulphuric ester of 3:3'-dichlorodianthrahydroquinoneazine (containing 39 parts of the ester salt and about 5 parts of sodium carbonate) is well mixed with a solution of 10 parts of glucose in 10 parts of water. To the paste thus obtained there are added 160 parts of ethyl alcohol containing 6 parts of dissolved potassium hydroxide. The precipitate is isolated and treated as in Example 2.

Example 4

248 parts of an aqueous paste of the potassium salt of the tetra-sulphuric ester of 3:3'-dibromodianthrahydroquinoneazine containing 90 parts of the ester salt and about 12 parts of sodium carbonate are well mixed with a dextrin mucilage made from 36 parts of dextrin, 33 parts of water and 3 parts of 30% caustic potash solution. The paste is slowly stirred into 350 parts of ethyl alcohol containing 26.5 parts of dissolved potassium hydroxide. The precipitate is isolated and treated as in Example 2.

Example 5

To 200 parts of an aqueous solution of the potassium salt of the tetra-sulphuric-ester of 3:3'-dichlorodianthrahydroquinoneazine, (containing 39 parts of the ester salt and 4 parts of the sodium carbonate) there are added 10 parts of dextrin. The dextrin is well mixed in and then a mixture of 160 parts of ethyl alcohol and 50 parts of potassium hydroxide are added. The dyestuff is precipitated together with dextrin as a granular mass. This is isolated and treated as in Example 2.

Example 6

To 600 parts of ethyl alcohol, in which have been dissolved 30 parts of potassium hydroxide, there are added 42 parts of dextrin. To the stirred suspension thus formed 300 parts of a paste containing 120 parts of the potassium salt of the tetrasulphuric ester of 3:3'-dichlorodianthrahydroquinoneazine and 15 parts of sodium carbonate are run in slowly. The stirring is continued for a short time and the working up is the same as described in Example 2.

Example 7

6 parts of dextrin and 6 parts of potassium hydroxide powder are stirred into 50 parts of an aqueous paste of the sodium salt of the sulphuric ester obtained from nitrodibenzanthrone, containing 18 parts of the ester salt and 1.8 parts of sodium carbonate. Into this mixture 150 parts of methyl alcohol are slowly stirred. The resulting mixture is filtered, the filter cake sucked as free from liquid as possible, washed with 37 parts of methyl alcohol containing 1.5 parts of dissolved potassium hydroxide powder, dried at 27-30° C. at atmospheric pressure or at reduced pressure, and pulverised.

Example 8

To 85 parts of methyl alcohol, in which have been dissolved 3.5 parts of potassium hydroxide powder, there are added 3.5 parts of dextrin. To the stirred suspension thus formed there are added 50 parts of an aqueous paste of the sodium salt of the sulphuric ester of leucodichloroisodibenzanthrone containing about 15 parts of the ester salt and 1.8 parts of sodium carbonate. The mixture is filtered, the filter cake sucked as free from liquid as possible, washed with 30 parts of methyl alcohol containing 1.2 parts of dissolved potassium hydroxide powder, dried at 27-30° C. at atmospheric pressure or at reduced pressure, and pulverised.

Example 9

To 150 parts of methyl alcohol, in which have been dissolved 6 parts of potassium hydroxide powder, there are added 4.3 parts of dextrin. To the stirred suspension thus formed there are added 50 parts of an aqueous paste of the sodium salt of the sulphuric ester of leuco-dibromopyranthrone containing about 20 parts of the ester salt and 1.8 parts of sodium carbonate. The mixture is filtered, the filter cake sucked as free from liquid as possible, washed with 30 parts of methyl alcohol containing 1.2 parts of dissolved potassium hydroxide powder and dried at 27-30° C.

The resulting powder can be mixed with finely powdered urea, if desired, for instance with half its weight of urea, in order to obtain a less concentrated dyestuff powder.

Example 10

To 100 parts of methyl alcohol in which have been dissolved 4 parts of sodium hydroxide powder there are added 4 parts of dextrin. To the stirred suspension thus formed there are added 50 parts of an aqueous paste of the sodium salt of the sulphuric ester of leuco-dibenzanthrone containing about 15 parts of the ester salt and 1.8 parts of sodium carbonate. The mixture is filtered, the filter cake sucked as free from liquid as possible, washed with 25 parts of methyl alcohol containing 1 part of dissolved sodium hydroxide powder, dried at 27–30° C. and pulverised.

Example 11

To 192 parts of methyl alcohol in which have been dissolved 4 parts of sodium hydroxide powder there are added 5 parts of dextrin. To the stirred suspension thus formed are added 208 parts of an aqueous paste of the sodium salt of the disulphuric-acid ester of leuco-flavanthrone (containing about 15 parts of the ester salt and about 1.2 parts of triethanolamine). The mixture is filtered, the filter cake sucked as free from liquid as possible, washed with 76 parts of methyl alcohol containing 1.5 parts of sodium hydroxide and dried at 27–30° C.

The concentrated product is reduced to a finely divided powder and is then, if desired, diluted to a lower strength by mixing with dry, finely powdered urea, for instance with its own weight of urea.

Example 12

43.5 parts of pyranthrone are converted to the corresponding leuco ester sodium salt by the process of British Patent No. 247,787. Inorganic salts are removed by washing with cold water, and then 2.5 parts of triethanolamine are added and also enough water to give a paste of a total weight of 125 parts.

To 360 parts of methyl alcohol there are added, with stirring, 18 parts of dextrin, the above dyestuff paste (125 parts) and 1.6 parts of triethanolamine. The mixture is filtered, the filter cake sucked as free of liquid as possible, washed with a solution of 0.3 part of triethanolamine in 64 parts of methyl alcohol. The washed material is mixed with 8 parts of triethanolamine and sufficient methyl alcohol (12–80 parts) to permit of complete mixing, and the mixture then dried at 27–30° C. and pulverised. The product, although containing 9–10% of triethanolamine, is a "dry" free-flowing powder.

The use of triethanolamine as alkali instead of potassium or sodium hydroxide gives a product with higher solubility. With the dyestuff of this example, the sodium and potassium salts are not soluble enough for all purposes.

This process is simple to carry out. It may use as starting materials the aqueous pastes of the dyestuffs as they are isolated in the ordinary course of manufacture. Upon mixing the dyestuff paste, dyestuff diluent, alkali, and organic liquid, a readily filterable mixture is obtained, and after filtration the required dyestuff preparation is obtained mixed with a relatively small amount of liquid. This liquid as it consists mainly of a low-boiling organic constituent is easily removed by a short drying operation at ordinary or slightly raised temperatures, with or without reduced pressure. This short drying operation makes the process especially suitable for use with dyestuffs, such as tetra-sulphuric esters of dianthrahydroquinoneazines which are not ordinarily well adapted to prolonged heat treatment, since any decomposition which takes place releases acid, and this acid if not neutralised initiates spontaneous decomposition of the whole dyestuff.

The products of the process are stable, readily soluble in water, and need not contain more than small proportions of the diluent, for instance, 25–50% of the weight of the dyestuff.

As many apparently widely different embodiments of this invention may be made without departing from the spirit and scope thereof, it is to be understood that the invention is not limited to the specific embodiments thereof, except as defined in the appended claims.

I claim:

1. In the process for preparing dry dye preparations of soluble salts of sulfuric esters of leuco anthraquinone vat dyestuffs, the steps which comprise, mixing an aqueous paste containing a soluble salt of the said ester with a water miscible organic liquid in which the estersalt is relatively insoluble and a water-soluble dyestuff diluent, in the presence of an alkali, separating off the organic liquid in which the water contained in the cake is dissolved, and subjecting the remaining dyestuff preparation to a mild drying treatment.

2. The process for preparing dye preparations as defined in claim 1 in which urea is added prior to the mild drying treatment.

DAVID ALEXANDER
WHYTE FAIRWEATHER.